(12) United States Patent
Hartenberger

(10) Patent No.: US 7,362,997 B2
(45) Date of Patent: Apr. 22, 2008

(54) METHODS AND APPARATUS FOR CURRICULUM PLANNING

(76) Inventor: Aurelia Hartenberger, 12668 Bradford Woods Dr., St. Louis, MO (US) 63127

( * ) Notice: Subject to any disclaimer, the term of this patent is extended or adjusted under 35 U.S.C. 154(b) by 468 days.

(21) Appl. No.: 10/829,517

(22) Filed: Apr. 22, 2004

(65) Prior Publication Data

US 2005/0239032 A1 Oct. 27, 2005

(51) Int. Cl.
*G09B 3/00* (2006.01)
(52) U.S. Cl. ................................ 434/350; 434/322
(58) Field of Classification Search ................ 434/350
See application file for complete search history.

(56) References Cited

U.S. PATENT DOCUMENTS

| | | | |
|---|---|---|---|
| 5,904,485 A | | 5/1999 | Siefert |
| 5,978,648 A | * | 11/1999 | George et al. ............... 434/362 |
| 6,149,441 A | * | 11/2000 | Pellegrino et al. .......... 434/350 |
| 6,334,779 B1 | | 1/2002 | Siefert |
| 6,343,319 B1 | | 1/2002 | Abensour et al. |
| 6,386,883 B2 | | 5/2002 | Siefert |
| 6,507,726 B1 | | 1/2003 | Atkinson et al. |
| 2002/0160349 A1 | | 10/2002 | Kon |
| 2003/0017442 A1 | | 1/2003 | Tudor et al. |
| 2003/0064354 A1 | | 4/2003 | Lewis |
| 2004/0009461 A1 | | 1/2004 | Synder et al. |

\* cited by examiner

*Primary Examiner*—Robert E. Pezzuto
*Assistant Examiner*—Cameron Saadat
(74) *Attorney, Agent, or Firm*—Armstrong Teasdale LLP

(57) ABSTRACT

A method for curriculum planning using a curriculum planning tool is described. The method includes selecting an academic discipline, a grade level, and a course, entering local objectives to be met by the selected course, and aligning the local objectives with one or more standards. The method also includes mapping the selections, local objectives, and standards into one or more concepts, developing instructional activities for the selected course that teach the concepts, and assessing the curriculum against the standards using criterion-reference assessments based on the instructional activities.

24 Claims, 10 Drawing Sheets

ACTIVITY WORKSHEET

Lesson Snapshot | Fine Arts - Music | Street Number ☐

Grade Level: 3
Discipline: Fine Arts - Music
Course Title: Music – 3rd Grade
Contributors: A. Hart.

ESSENTIAL LEARNING (Local Objective)

Grade-Level Objectives: [Alignment]
1. The student/s will acquire the knowledge and skills necessary to perform music and communicate through the arts (Standards 1, 2, 5, 6, 7)

| State Standards | [Alignment] | Concept | [Alignment] | Process | [Alignment] | National Standards: | [Alignment] |

Course Title Alignment: [Resource]

TO KNOW…

Select "Theme"/Topic [Children Songs]

CRITICAL CONTENT (Key Fact/s)
"The student will know that……"
Dynamics are the degrees of loudness in music (two basic types of dynamics: Gradual and Terrace). There are

VOCABULARY
Crescendo = gradually getting louder
Diminuendo = gradually getting softer [Modify…]

TO DO…

SKILL OBJECTIVE
"The student will be able to…"
Sing a song with expression, using the notated expressive elements of dynamics and tempo.

[Processes] [Diagram]

TO UNDERSTAND…

CONCEPT/S
"The student will understand that…."
Expressions

ESSENTIAL QUESTION
How is expressive singing created?

ENDURING UNDERSTANDING (Generalization)
Singing with various dynamics creates expressive singing

[Concepts] [Diagram] [Save Charts]

Instructional Strategies
| PCT |
| CL |
| TC |

- Curriculum Mapping
- Unit Planning
- Alignment
- Hierarchy of Instructional Activities
- Learning System

Resource Tools
- Audio Clip
- Video Clip
- Visual Clip
- Bloom's Taxonomy
- Complex Problem Solving
- Structure of Knowledge

INSTRUCTIONAL ACTIVITIES

PRIOR KNOWLEDGE/EXPERIENCE
"The student/s will have:"
Practiced music using dynamic levels of soft and loud.
Learned the terms "crescendo" and "diminuendo"

PRESENTATION [Suggestions]
"The teacher will:"
Discuss the text of the song and ask students if some of the words could be emphasized for greater understanding of the text.
Then discuss how you could put emphasis or draw more attention to one or

PREPARATION
"The teacher will: (Establish set)"
Ask students to identify those sounds that are loud and soft in the classroom.
Demonstrate the effects of loud and soft sounds by playing the piano loud then soft

PRACTICE PROCESS [Suggestions]
"The student/s will:"
Select words of importance in the song
Speak the words of a song with emphasis on selected words of importance
Sing the melody using "La"

[GO TO ASSESSMENT]

Resources
List all resources. Please be specific. To help locate resources, you could Also add location. i.e. music library, school library, classroom files, etc.

Materials
List all materials, supplies and equipment needed to teach this lesson.

Library Media Center Resources/Services
Hyperlink: [____] For example: ISSN [____]
www.yaho.com Learning styles: [____] Auditory
i.e a song, rap, poem, story, advertisement, or jingle, perform it for the cl

FIG. 10

METHODS AND APPARATUS FOR CURRICULUM PLANNING

BACKGROUND OF THE INVENTION

This invention relates generally to curriculum planning, and more specifically, to methods and apparatus for curriculum planning which focuses on an instructional curriculum format that supports a hierarchy of conceptual development.

The recent trends in assessment of students at all levels imposed by federal and state governments have resulted in problems that many states, and schools within those states, are trying to resolve. The problems have resulted because the paradigms of traditional standardized testing and bell shaped curves fitted to standardized test scores do not align very well with the national and state imposed expectations. Alternative forms of assessment, for example, performance assessment, portfolio assessment, standards-based assessment, and authentic assessment are better suited for today's education standards that require critical thinking. These assessment forms involve on-going evaluation as well as benchmark assessments that are aligned to the instructional curriculum format. Components of the format, such as indicators of analysis (inductive and deductive), translation, classifying, comparing, abstracting and the synthesis and evaluation of knowledge are essential elements in assessment of in-depth knowledge, understanding, and the application of that knowledge. The quality of these components may be assessed by traits of accuracy and credibility, clarity, comprehensiveness, organization and complexity, etc.

As described above, emphasis is better placed on conceptual development, as content tests do not ensure that the student understands the subject matter being tested. Rather, content tests only ensure that portions of the subject matter have been memorized. Conceptual development based testing requires that students be able to define meaning and better address the standards currently being promulgated, specifically, the ability to think critically, problem solve, and reason which is thought to be illustrative of mastering the material conceptually.

While letter grades are best for illustrating a mastery of content (e.g., memorization), grading scales are thought to be more effective, because grading scales clarify the assessment criteria and standards for process performance and understanding of in-depth content knowledge.

BRIEF DESCRIPTION OF THE INVENTION

In one aspect, a method for curriculum planning using a curriculum planning tool is provided. The method comprises selecting an academic discipline, a grade level, and a course, entering local objectives to be met by the selected course, and aligning the local objectives with one or more standards. The method further comprises mapping the selections, local objectives, and standards into one or more key concepts that support a conceptual framework, developing instructional activities for the selected course that teach the concepts, and assessing the curriculum against the standards using criterion-reference assessments based on the instructional activities.

In another aspect, a computer for curriculum planning and assessment is provided. The computer is programmed to accept input data relating to grade level selection, academic discipline selection, course selection within the academic discipline, and local objectives to be met by the selected course. The computer is further programmed to align the local objectives with discipline specific grade level objectives and one or more standards, map critical content and process level input data with one or more concepts to be taught and the standards, accept input data relating to instructional activities for teaching the concepts, and assess the curriculum against the standards based on the instructional activities.

In still another aspect, a method for mapping a curriculum according to concepts utilizing a curriculum mapping tool is provided. The method comprises choosing a grade level, a topic, and a concept, selecting an academic discipline and a course within the discipline to be used for teaching the concept, selecting a discipline-specific subtopic, choosing at least one of a discipline concept and a discipline process, generating at least one of a concept map of information and a process map action, based upon said choice of discipline process and discipline concept, and identifying instructional activities for the course which align with the concept.

BRIEF DESCRIPTION OF THE DRAWINGS

FIG. 3 is an example course detail screen for a curriculum planning tool.

FIG. 4 is an example course activity screen for a curriculum planning tool.

FIG. 10 is an example alignment tool for aligning national standards with their scope and sequence descriptor of the discipline specific critical content (factual knowledge, vocabulary and skill based objectives) with local objectives.

DETAILED DESCRIPTION OF THE INVENTION

Processes and apparatus are described herein which help users, for example, teachers, develop a curriculum and instruction materials that define learning as an ability that evolves from a realization of critical content through the development of processes, skills, and conceptual understanding. The conceptual level of understanding learned from the developed processes and skills are believed to result in integrated thinking by students, rather than just a memorization of content. National, state, and local standards, grade level objectives and benchmarks provide the basis for the developed processes, skills, and conceptual understanding. In addition, key content, critical concepts, and desired performance and skill objectives are utilized in aligning curriculums with assessments, organized by complexity.

Concepts are ideas based upon experiences (processes). Concepts are not isolated, but are related and interconnected to other ideas (concepts). By using an instructional curriculum format that supports the conceptual development hierarchy, the complexity of the learning process levels, the relationships of concepts and identification of discipline sharing concepts, integration of information across discipline areas can be realized to develop further conceptual understanding.

Sample content specific concepts and process diagrams are also provided to help create an organized mental image of information that will support instructional strategies and the assessment of skills, comprehension, and in-depth understanding taught in the curriculum. These discipline specific concept and process diagrams provide a more efficient, sequential, and comprehensive model for developing learning experiences and assessments that will help students construct meaning rather than merely accumulate facts or complete tasks.

The technical effect of the below described embodiments is to organize and present both resources and tools to generate a curriculum guide and framework in all academic disciplines and content areas (i.e., communication arts, math, science, social studies, fine arts, practical arts, physical education, etc.) that supports conceptual development and integration of information. Also provided are instructional lesson plans, concept and process mapping diagrams, assessment tools, unit planning, a scope and sequence of each discipline's critical content (factual knowledge and skill based objectives) aligned to the standards, curriculum reporting tools and curriculum mapping. In addition, links to external resources may also be provided.

Figure 1:
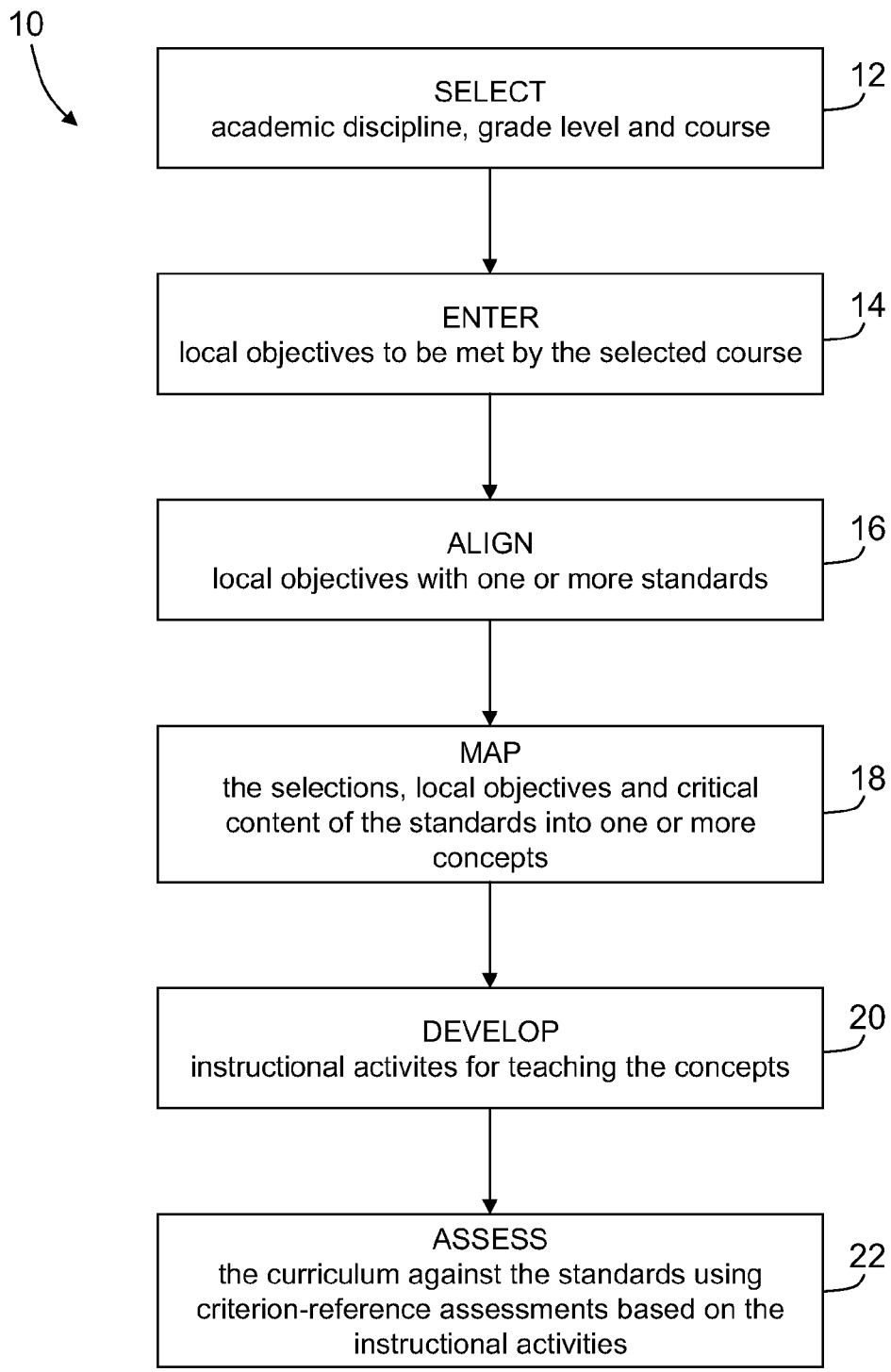
FIG. 1 is a flowchart illustrating a method for assessing a curriculum.

FIG. 1 is a flowchart 10 illustrating a method of curriculum planning and assessment using a curriculum planning tool. Referring specifically to FIG. 1, an academic discipline, a grade level, and a course are selected 12, and local objectives to be met by the selected course are entered 14. Local objectives are aligned 16 with one or more standards and the selections, local objectives, and critical content of the standards are mapped 18 into one or more concepts. Content and processes for teaching each concept are developed 20 through instructional activities which reinforce the content and processes. The curriculum is assessed 22 against the standards using criterion-reference assessments based at least partially on completed instructional activities.

Alignment 16 includes alignment between themes, topics, concepts, processes, skills, equity concepts in gender, ethnic, and racial awareness, career path planning, technology and research skills, differentiation for ability levels, and critical content with national standards, state standards, local standards, and grade-level objectives. In one embodiment, the standards and objectives are accessed from databases which are either stored locally in a computer or are accessible over a computer network. Searching and reporting features generated utilizing the data within the databases provide quick access to information, references and the organization of materials. As such, the above method, in one embodiment embodied as a computer program, guides the user (e.g., a teacher) through a step-by-step procedure for developing and mapping a curriculum with assessments in all academic disciplines that is based on national, state, and local standards, while providing a focus on conceptual understanding and the learning process levels, that further supports interdisciplinary and multidisciplinary cross-curricular integration.

Figure 2:
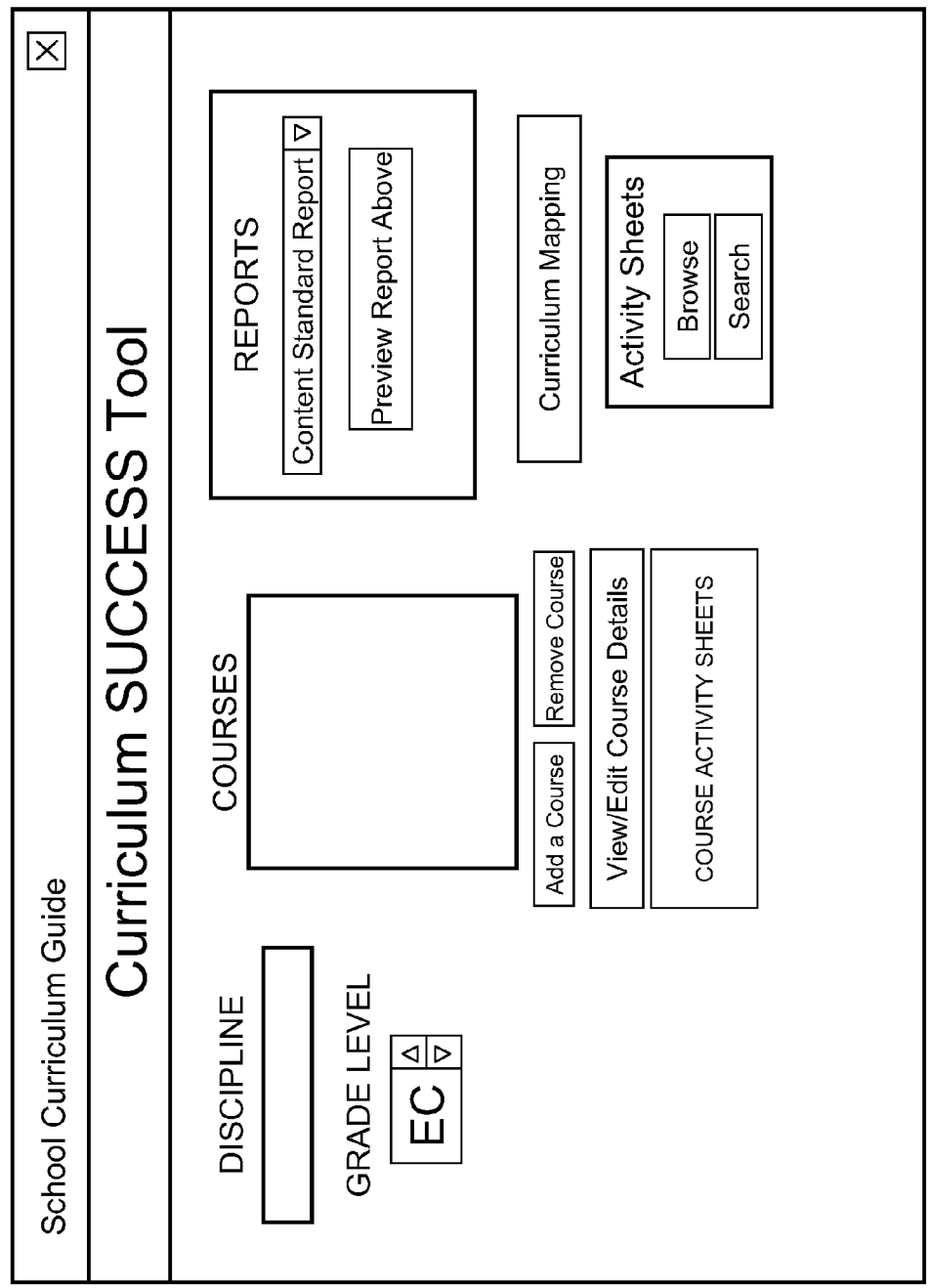
FIG. 2 is an example home screen for a curriculum planning tool.

FIG. 2 is an illustration of a home screen 100 for a computer program product which embodies the above described processes. Home screen 100 includes data entry fields where a user can enter an academic discipline, a grade level, and a list of courses. A grade level of EC (early childhood (e.g., pre-school)) is shown, but all grade levels including post secondary education is contemplated. Courses may be selectively added or deleted from the list of courses. A user is able to select to view and edit details of a course, and able to select to create, browse, view, and search activity sheets for selected courses. In addition, a user may select to generate reports from home screen 100. As illustrated, one such report is a content standard report. Such reports are described in additional detail below with respect to Appendix A. Home screen 100 further includes the ability for a user to select to map a curriculum as also further described below.

Figure 3:
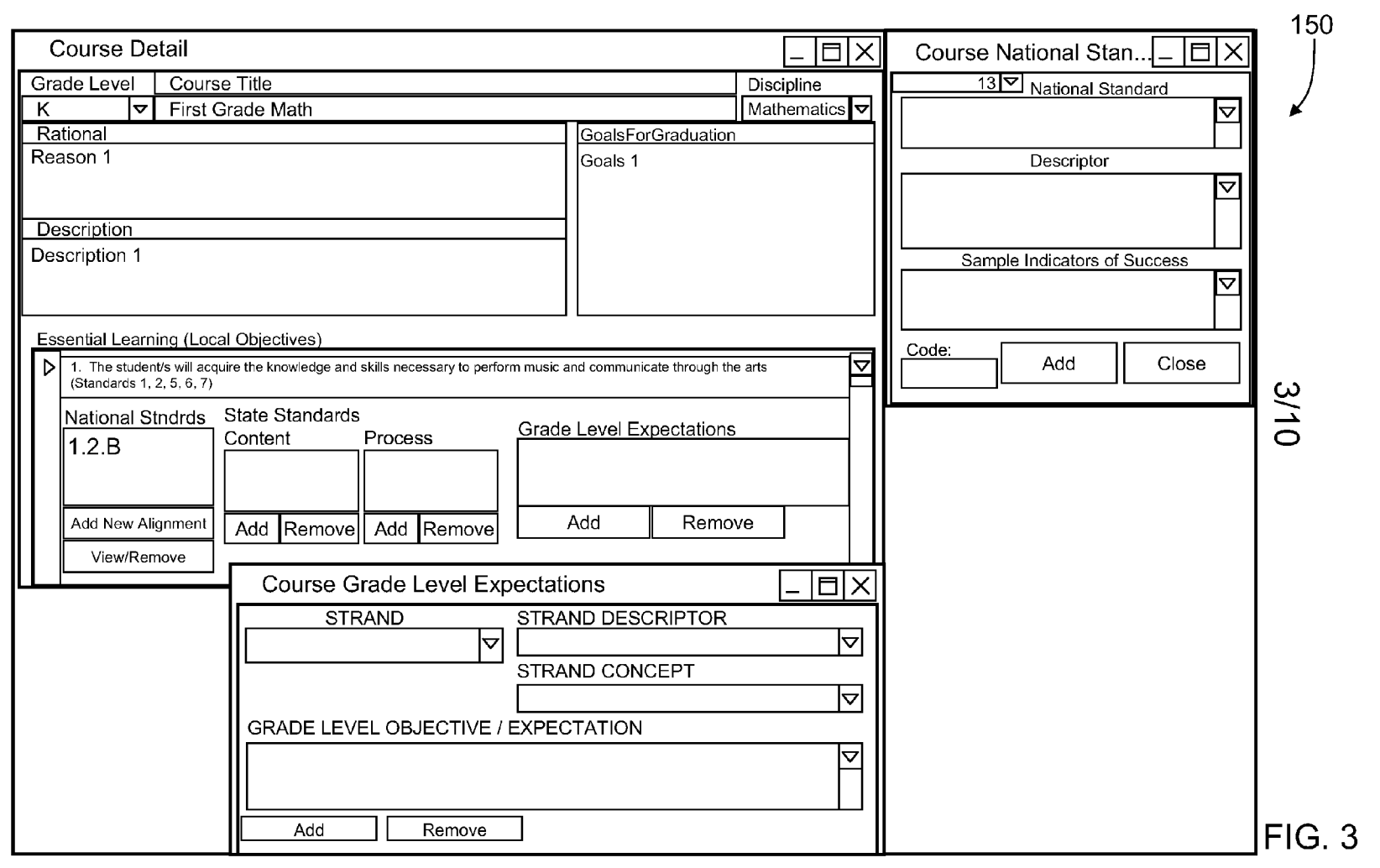

Entry or selection of a discipline in home screen 100 causes a list of courses to be displayed, and be made available for selection. The user can select a course and then select to view and/or edit details for the course. FIG. 3 is one embodiment of a view/edit course details screen 150 providing a user interface that allows the user to manipulate information regarding such course details. Course details screen 150 is further utilized for adding information regarding a new course. Specifically, the user is able to select a grade level and a discipline (e.g., an academic discipline) using course details screen 150.

In addition, the user may edit (or add) a course title, a course rationale, a course description, and content area/departmental goals for graduation to be met by the course. The user is also able to enter (i.e., view, add, or edit) one or more essential learning objectives, sometimes referred to as local objectives for the course. In the embodiment illustrated, the user is able to align the local objectives with national and state standards, in addition to grade-level expectations (as shown), which are sometimes referred to as benchmarks. In one embodiment, the user manually enters the national and state standards and grade level expectations for each discipline. The portion of course details screen 150 which allows alignment of the local objectives, national and state standards, and grade-level expectations is sometimes referred to as an alignment tool. A user is able to add multiple local objectives to course details screen 150, each including an alignment tool allowing alignment of the local objective with national and state standards and grade-level expectations.

Figure 10:
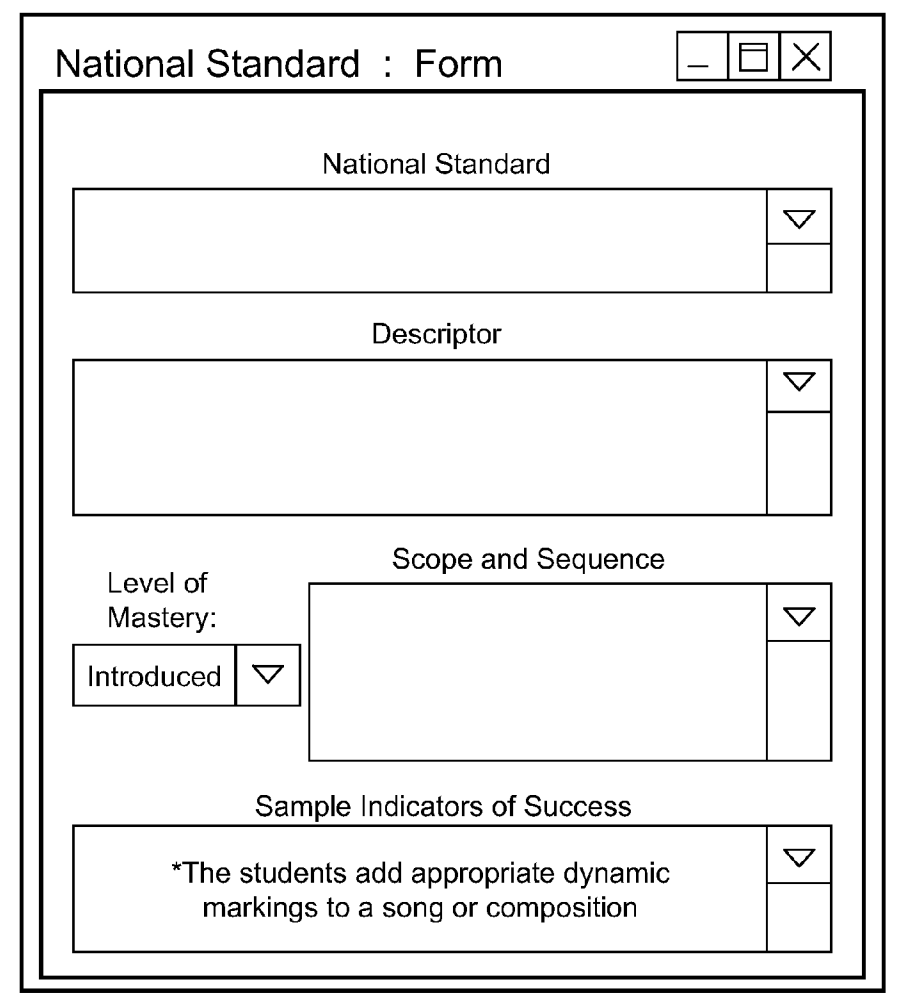

In a specific embodiment, to align a local objective with a national standard, an "Add New Alignment" option is selected and a national standards window provides a listing of the national standards for the selected course and grade level. By selecting one of the national standards, descriptors aligned with each standard are available for selection. By selecting a descriptor, sample indicators of success that have been aligned to the descriptor are available and listed as sample indicators of success. A code assigned to the selected national standard descriptor is displayed. By selecting one of the sample indicators of success, examples aligned to that national standard descriptor will be illustrated. An example user interface for selecting national standards, descriptors, indicators of success, and a scope and sequence for the standard is illustrated in FIG. 10, described further below.

A selected national standard descriptor is added as a national standard descriptor code to course details screen 150. A national standard descriptor code includes four digits. The first two digits are the Discipline Code (i.e., MU for music, CA for Communication Arts, etc.). The third digit is the standard number (i.e., 1, 2, 3) and the third digit is the descriptor letter (i.e., a, b, c).

To remove a national standard that has been aligned with a local objective, the national standard is selected, and a view/remove button is actuated. The actuation causes a full description of the selected national standard to be displayed. Selection of a remove button removes the selected national standard from the course.

With respect to state standards, to align a local objective with a state standard, a process similar to that of alignment of local objectives with national standards is utilized. In the embodiment illustrated, course details screen 150 provides an ability to align both content and process state standards with local objectives. Selection and adding of such state standards further allows alignment of the selected state standards with the course and grade level. To provide two content examples, in the Fine Arts, students in Missouri public schools will acquire a solid foundation which includes knowledge of: FA1—process and techniques for the production, exhibition or performance of one or more of the visual or performed arts, FA2—the principles and elements of different art forms, FA3—the vocabulary to explain perceptions about and evaluations of works in dance, music, theatre and visual arts, FA4—interrelationships of visual and performing arts and the relationships of the arts to other disciplines, FA5—visual and performing arts in historical and cultural contexts. In the Communication Arts, students in Missouri public schools will acquire a solid foundation which includes knowledge of and proficiency in: CA1—speaking and writing standard English (including grammar usage, punctuation, spelling, capitalization), CA2—reading and evaluating fiction, poetry and drama.

Process examples include the goals that students will acquire the knowledge and skills to gather, analyze and apply information and ideas. Students will demonstrate within and integrate across all content areas the ability to: 1.1—develop questions and ideas to initiate and refine research, 1.2—conduct research to answer questions and evaluate information and ideas, 2.1—plan and make written, oral and visual presentations for a variety of purposes and audiences, 2.2—review and revise communications to improve accuracy and clarity, and 2.3—exchange information, questions and ideas while recognizing the perspectives of others.

Alignment of state grade-level objectives with national standards, state standards and local objectives for a selected course and grade level is also accomplished in a manner similar to that of alignment of national standards and local objectives. Select the alignment button to state grade-level objectives to display an embodiment that serves to align the activity sheet by a selection filter for strand, strand descriptor, strand concepts and state grade-level objectives. Selection of an "add" button adds the state grade-level objective to the course title sheet and assessment alignment sheet and aligns that activity sheet and assessment sheet to the state grade-level objective. Selection of a "remove" button removes the grade level objective and alignment from the course title sheet and assessment alignment sheet.

FIG. 4 illustrates one embodiment of a course activity sheet 200 illustrating instructional activities. From home screen 100, a user selects a discipline and a course, then selects a course activity sheet. In one embodiment, a user interface including an otherwise blank course activity sheet is provided with grade level, discipline, and course title information completed although in one embodiment, the completed information can be edited.

Course activity sheet 200 presents the user with a user interface which includes a selected one of the local objectives that have been input through course details screen 150. Once one of the local objectives has been selected by a user, the previous alignment of grade level objectives, national standards, and state standards each can be viewed by selecting a corresponding alignment button.

Selection of a corresponding alignment button causes the display of a tool (e.g., a form) that serves as a resource for alignment. For example, the state standards and grade-level objectives are the same tools used with course details screen 150. When a user selects an add button on the displayed tool, alignment coding is displayed in a text box on that activity sheet, which is the process for aligning each individual activity sheet to the state and national standards and the grade-level objectives. When the user selects a remove button on the displayed tool, the alignment coding for the displayed information on the tool is removed from the individual course activity sheet. A user may access course alignments at any time for reference by selecting a view course alignment button.

Using the above described methodology helps users (e.g., teachers) frame critical concepts, key content, and desired performances for each course. Once the user views and aligns course activity sheets 200 (shown in FIG. 4) to the grade level objectives, state standards, and national standards resources, they are ready to enter additional data into course activity sheet 200. Specifically, the user references a scope and sequence (described further below) through the national standards alignment button, and the user completes a critical content statement of the local objective: "The student will know that . . . ". Vocabulary related to the critical content is entered and sorted via discipline and a selectable theme and topic. A user can select, edit, add, and remove vocabulary related to the critical content, for example and as illustrated "crescendo" and "diminuendo". The user also completes a skill objective statement: "The student will be able to . . . ", as illustrated for third grade music "sing a song with expression, using the notated expressive elements of dynamics and tempo. The user may reference level of processing related to achieving the skill objective by selection of a processes button, and a diagram button allows a user to view a graphic representation of the complexity of the learning process levels—capturing, connecting, performing, responding, creating, valuing/characterizing, that are relevant to each specific discipline. In addition, the user can create their own process mapping diagram by selecting the "sample charts" button that provides a variety of blank mapping diagrams that the user can select and use to enter data.

Further, the user may reference the national standards described above to develop a conceptual idea behind the local objective. The supporting conceptual idea can be found by removing the introductory action verb from the national standard descriptor (process standard), i.e., "Students will sing with expression." The concept is "expression." For deeper conceptual understanding, the user enters the question of "how" or "why" known as the essential questions, i.e., "How is expressive singing created?" The teacher then answers the essential question by entering statements of conceptual relationships that arise from the fact-based studies. These statements (generalizations) are broad and abstract and serve as the enduring understanding statements that are related to the local objective, i.e., "Singing with various dynamic levels create expressive singing." In one embodiment, by selecting the 'concepts' button, a discipline concept diagram that supports the hierarchy of conceptual development—knowledge, comprehension, application, analysis, synthesis, evaluation, is provided to help create an organized mental image of information that will support comprehension and in-depth understanding taught in the curriculum. Bloom's taxonomy of the cognitive domain serves as the reference for the sequencing of these discipline concepts. In addition, the user can create their own concept mapping diagram by selecting the "sample charts" button that provides a variety of blank mapping diagrams that the user can select and use to enter data.

Course activity sheet 200 further includes links to a number of tools. For example, a link to a curriculum mapping tool allows a user to identify connecting components of topic, theme, conceptual lens, and discipline. Specifically, the user is provided an interface which allows user to view and edit existing records or input new information for the following fields in a continuous form: discipline, course title, discipline subtopic, discipline concepts, discipline processes and skills, instructional activity, and a time line. From this curriculum mapping information, both reports and searches in each field are available for quick access and organization of materials.

In one embodiment, each discipline specific curriculum mapping activity can be accessed within a user interface to be used as a reference for developing course activity sheet 200 (e.g., a lesson plan). Within course activity sheet 200, the curriculum mapping activity information linked to the activity can be displayed in a floating window by clicking on the link to the curriculum mapping tool. Selection of a link button within in the curriculum mapping tool will cause to be displayed a discipline mapping floating window and a link back to course activity sheet 200. In one embodiment, the link to course activity sheet 200 is recorded within a curriculum mapping database.

Course activity sheets 200 further include one or more instructional activities windows which help to identify activities to practice complex performances and key skills, in order to develop and demonstrate increasing knowledge of critical, fact-based material and essential understanding. Instructional activities are related to essential understanding, grade-level objectives, and critical content. In one embodiment, an instructional activities plan includes prior knowledge, preparation, presentation, and practice/process each illustrated via example in FIG. 4.

Prior knowledge identifies prior critical content and mastery of skills needed for the activity. Preparation sets the stage for instruction by connecting students to the lesson with such strategies as questioning, assessing knowledge and interest, and identifying expectations that are relevant to the lesson. Suggestions are provided for preparation, for example, "Demonstrate the effects of loud and soft sounds by . . . ".

Presentation identifies instructional strategies of the teacher and aligns with the essential understanding and learning, benchmark/s, and fosters processes and concepts, and critical content. Suggestions are also included, for example and as illustrated, "Discuss the text of the song and ask students if some of the words could be emphasized for greater understanding . . . ".

Practice/Process identifies activities that help students perceive, process, rehearse, store, and transfer skills, knowledge, and understanding and aligns with presentation as described above. Suggestions for practice/process include for example, "select words of importance in the song".

Course activity sheets 200 further includes a link to resources which identify instructional literature and information, and a link to materials which identifies instructional materials, supplies, equipment, and facilities to meet education objectives and enhance the needs of diverse student populations.

Figure 5:
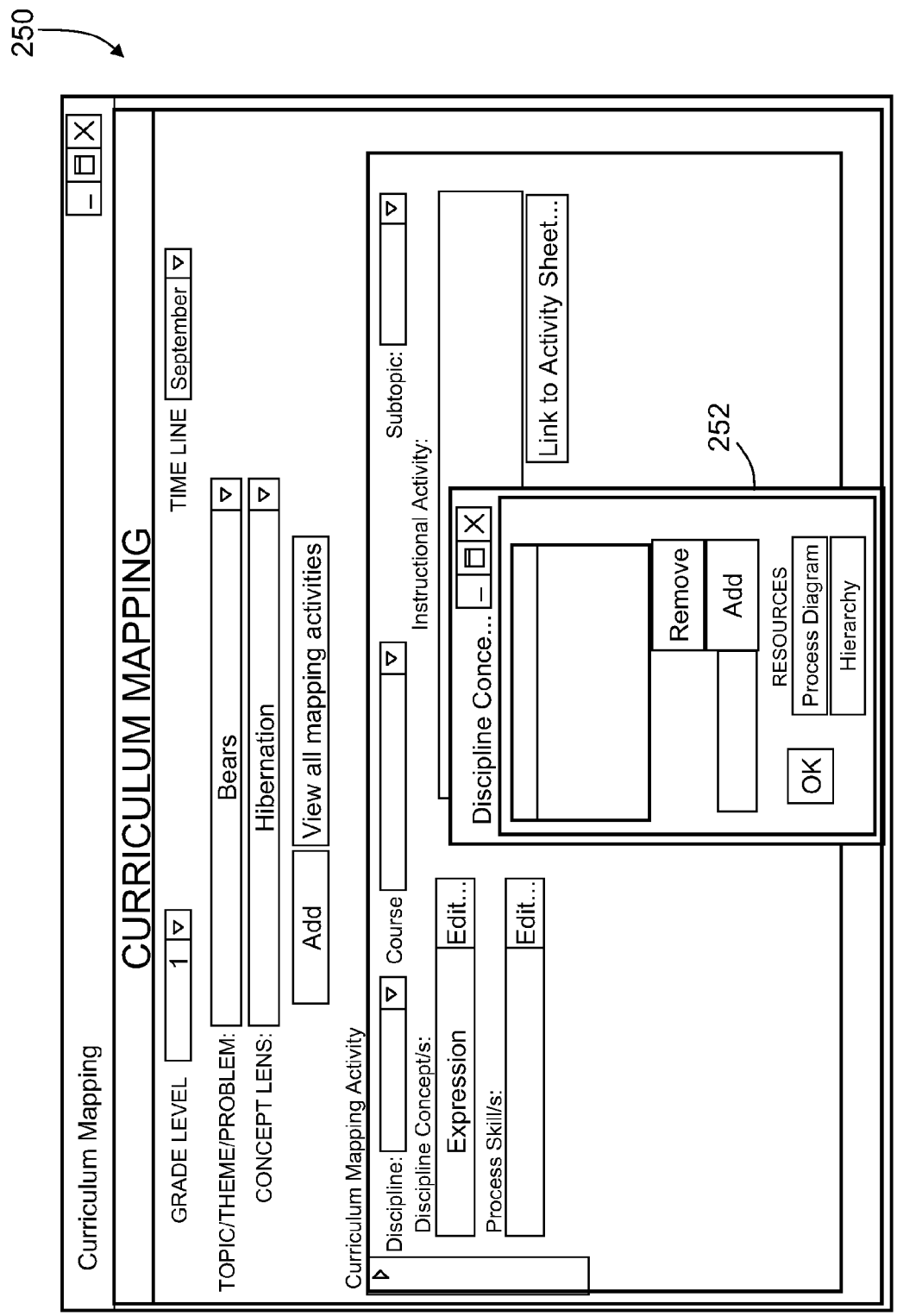
FIG. 5 is an example curriculum mapping screen for a curriculum planning tool.

FIG. 5 illustrates a curriculum mapping screen 250 which is displayed upon selection of a curriculum planning tool from either home screen 100 (shown in FIG. 1) or course activity sheet 200. Curriculum mapping screen 250 is utilized to organize and help identify some of the discipline specific content and knowledge that can be integrated across the curriculum. Curriculum mapping screen 250 allows a user to select and/or enter one or more of a grade level, a time line, a topic, and a concept. Curriculums are mapped together from multiple disciplines and multiple courses within those disciplines by selecting a "link to activity sheet" option. Selection of such an option, groups the various course activity sheets 200 into a single concept.

For example, the illustrated concept of "hibernation" can be mapped to a music course activity sheet in which the students learn about lullabies. Selecting a topic/theme allows content areas to enter the integration process. Many disciplines use only the topic/theme as a focus of study and this is recognized as multidisciplinary curriculum mapping. Interdisciplinary curriculum mapping examines the topic/theme through a common, discipline sharing conceptual lens. Curriculum mapping screen 250 allows a user to select and/or add/delete topics/themes and conceptual lens. The user can also select the "view all mapping activities" button as a reference.

Figure 6:
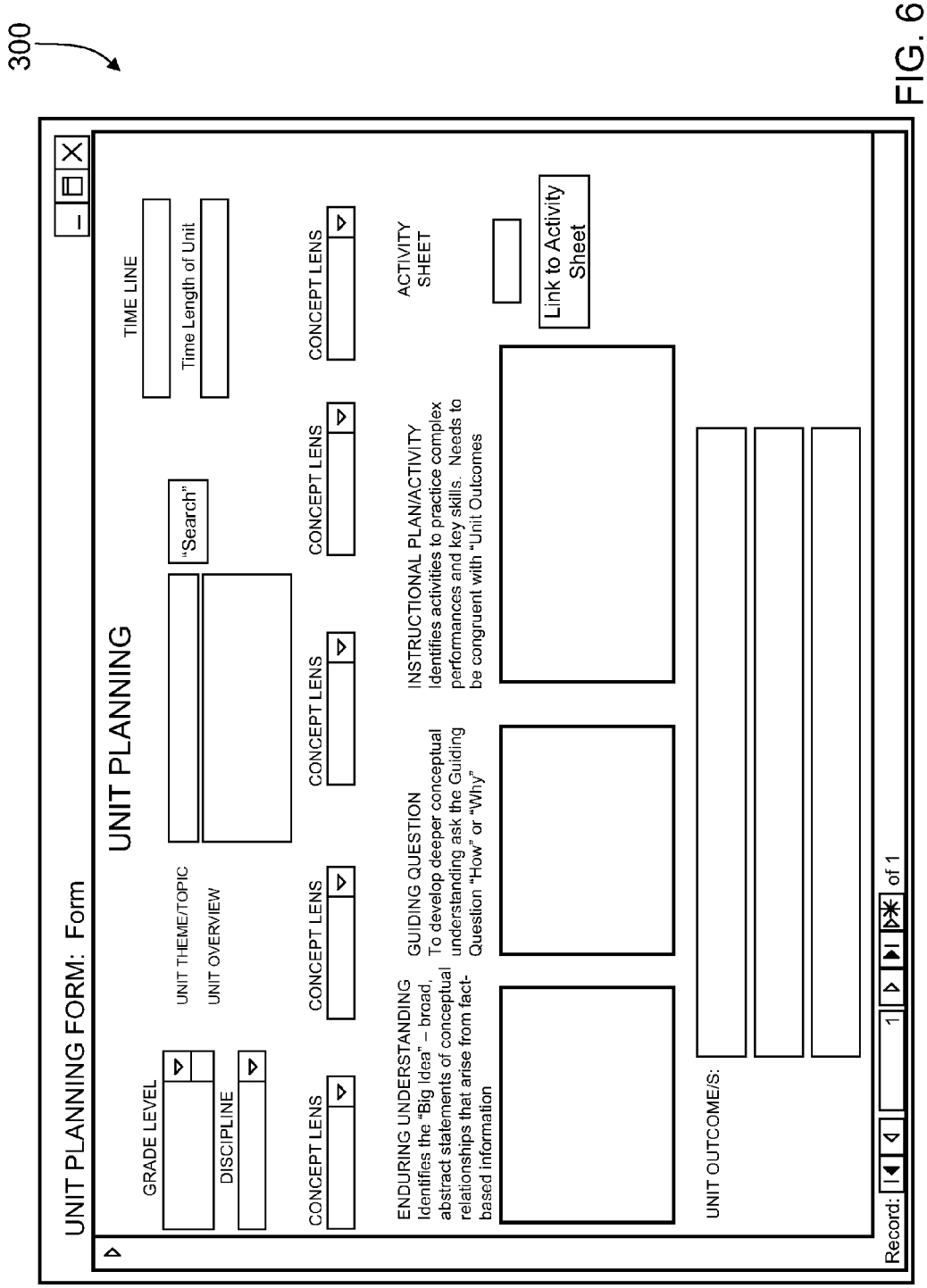
FIG. 6 is an example unit planning screen for a curriculum planning tool.

FIG. 6 illustrates a unit planning screen 300 which is displayed upon selection of unit planning from course activity sheet 200 (shown in FIG. 4). Unit planning screen 300 is utilized to web and integrate multiple course activities for a grade level, academic discipline, and topic (from numerous course activities sheets 200) for lesson planning. Unit planning screen 300 provides a single discipline webplanning tool that allows the teacher to plan, (using a school calendar), organize and delineate content topics/themes. A diagram of discipline related concepts aligned to the concept process are provided. These related concepts support thinking beyond the facts and facilitate the transfer of knowledge to a deeper understanding of the content area. Once the teacher selects the topic/theme and related concepts, they identify the "Big Idea," or generalization, by stating the relationship between two or more concepts. These "Big Idea/s" bring relevance to the content topic/theme and guide the teacher in identifying and framing the direct instruction for complex performances and key skills needed in the instructional activities. This unit planning form supports planning, creating, designing and aligning relevant activity sheets for instruction.

Figure 7:
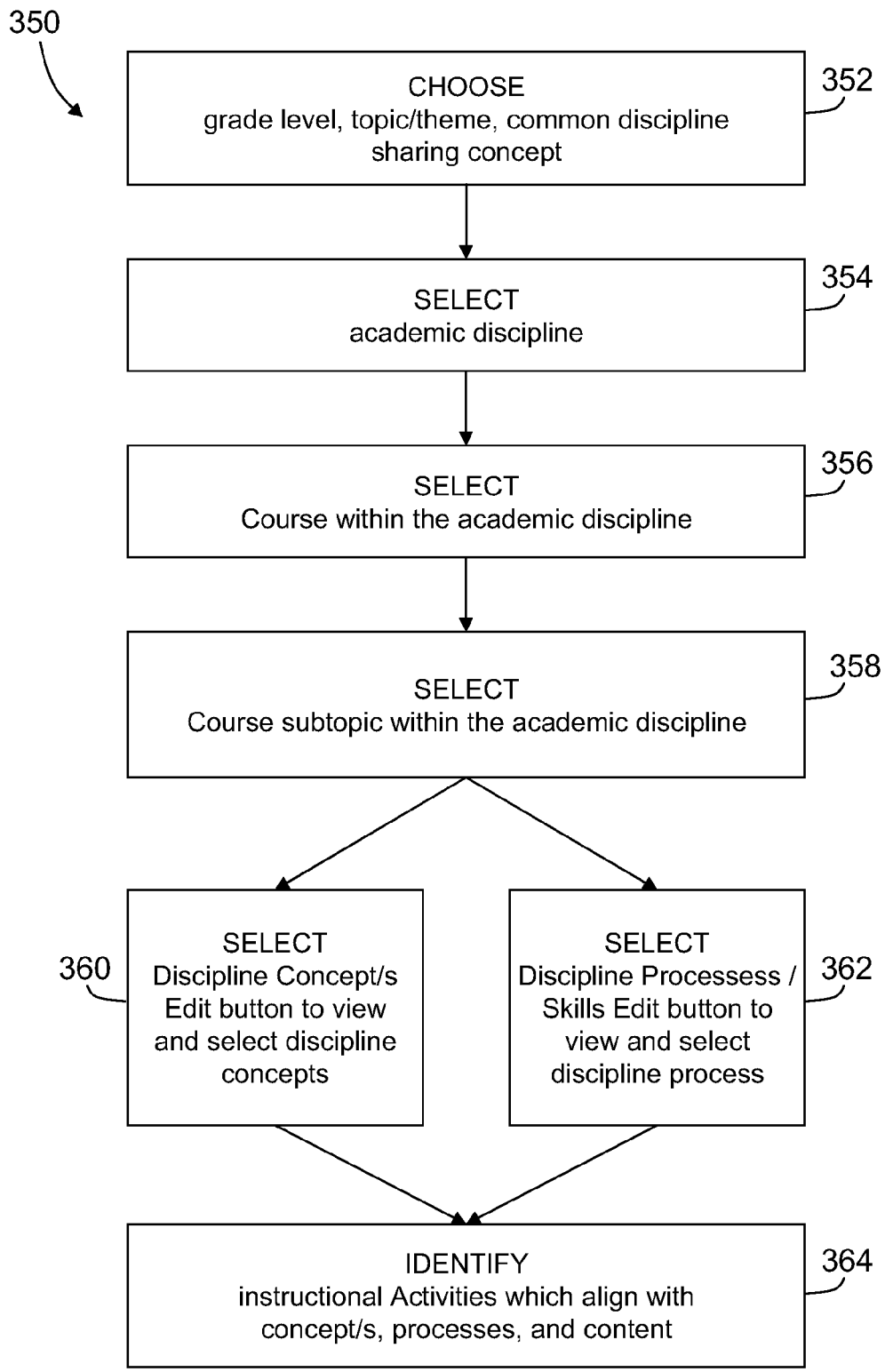
FIG. 7 is a flowchart illustrating a method for conceptually mapping a curriculum.

FIG. 7 incorporates some of the above described screens by illustrating a method for mapping a curriculum according to concepts. Referring to flowchart 350, a grade level, topic, common discipline, and concept are chosen 352, and an academic discipline is selected 354. Courses within the academic discipline are selected 356, and course subtopics are also selected 358. The user either selects 360 discipline concepts to view and/or edit or selects 362 discipline processes and skills to view and/or edit. Instructional activities which are aligned with the concept are then identified 358. As a specific example, for a selected grade level of "1" a topic of "Bears," and common discipline sharing conceptual lens—"hibernation" are chosen 352. An academic discipline—"Music" is then selected 354. Select 356 the course title within the academic discipline, for example, "First Grade Music". A discipline related subtopic is then selected 358, for example, "Lullabies". Once the discipline is chosen, the user can access the discipline specific concepts 360 by selecting the Discipline Concept/s "Edit" button on curriculum mapping screen 250 (shown in FIG. 5).

Figure 8:
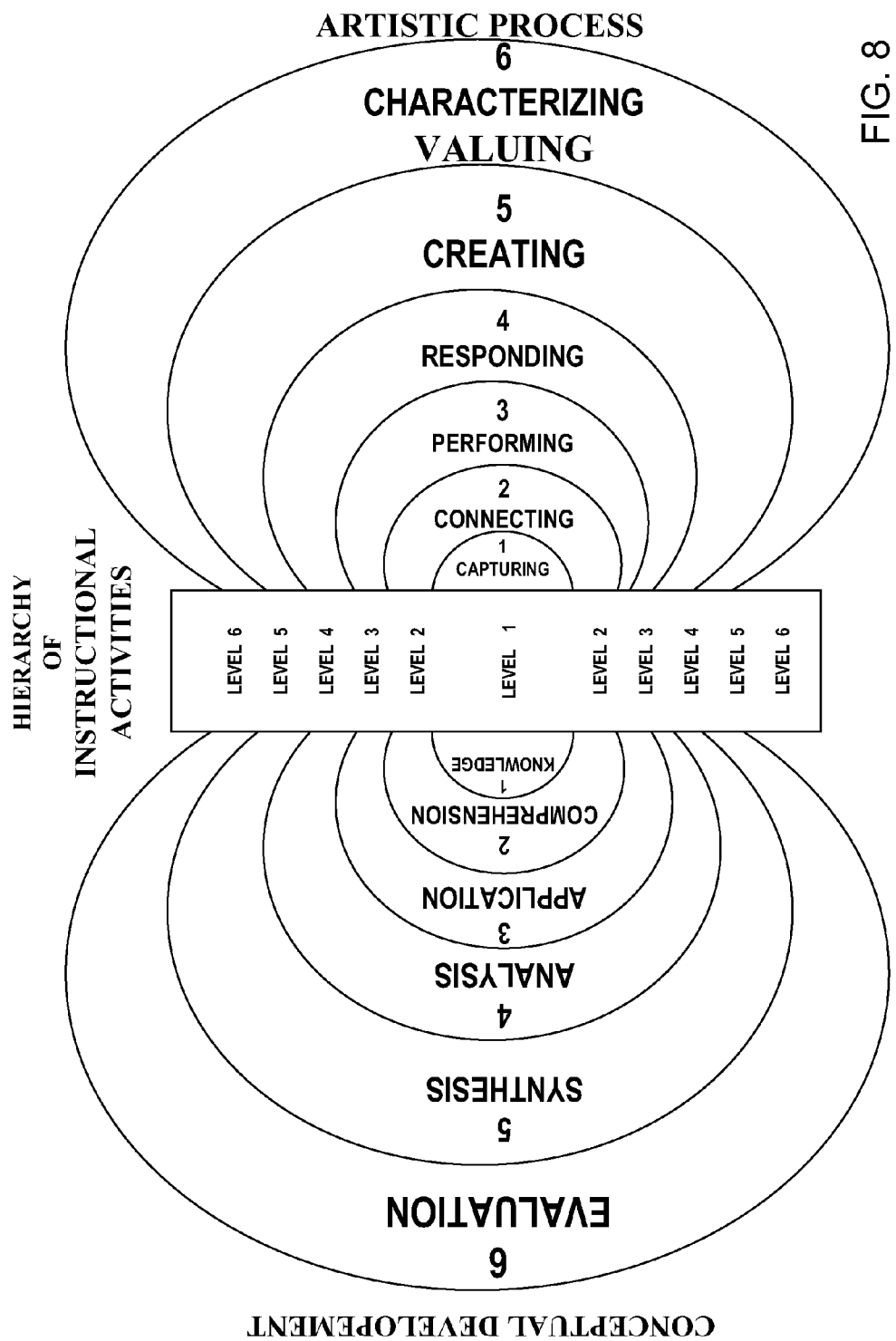
FIG. 8 is a learning process mapping diagram used to show the complexity of the learning process levels, specifically, capturing, connecting, performing, responding, creating, valuing/characterizing, within each discipline.
Figure 9:
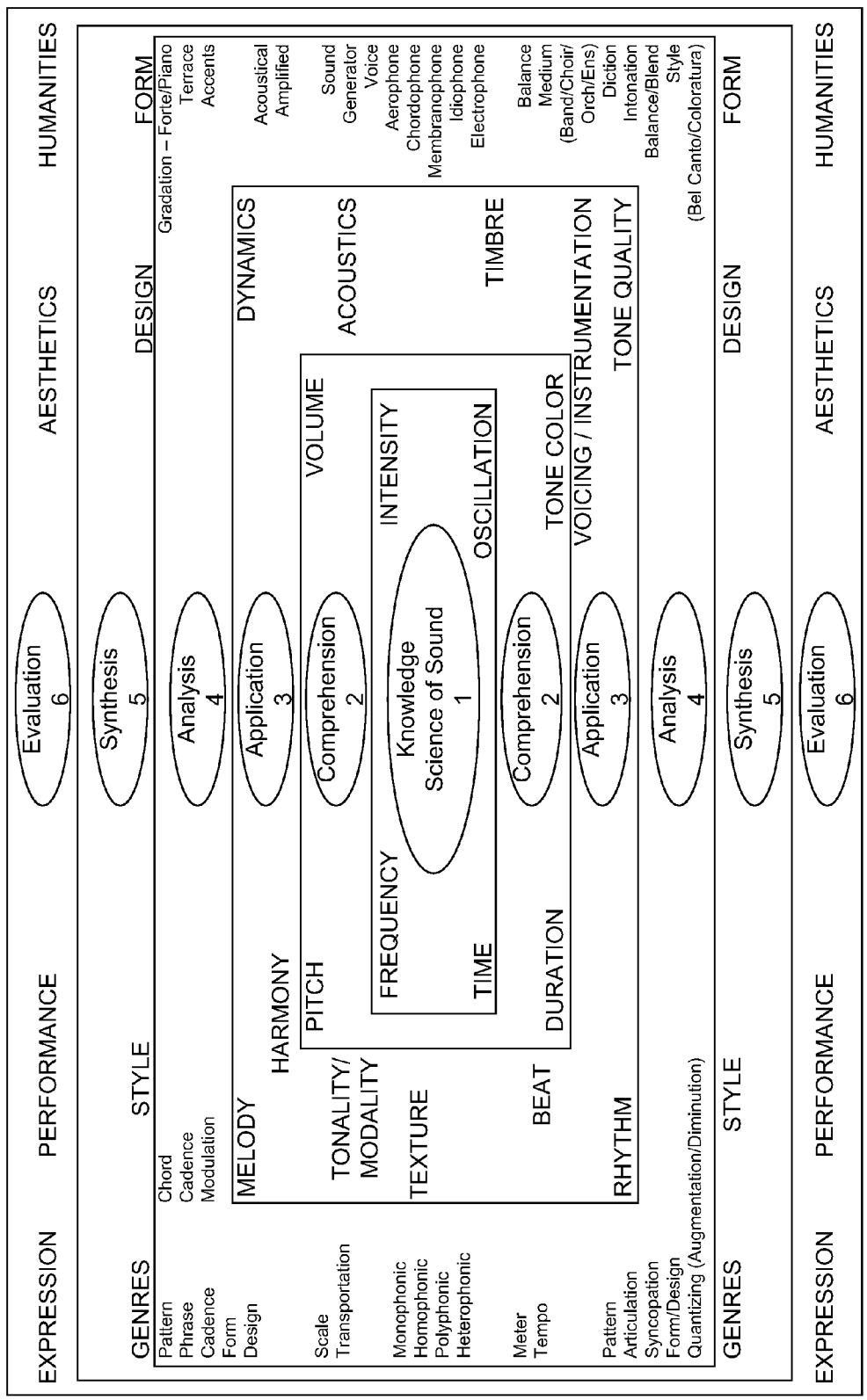
FIG. 9 is a concept mapping diagram used to show the hierarchy of conceptual development, specifically, knowledge, comprehension, application, analysis, synthesis, evaluation, within each discipline.

Referring back to FIG. 5, one embodiment of a discipline concept form 252 is interfaced to curriculum mapping screen 250. The user can view a hierarchy of discipline specific concepts diagram by selecting a "Hierarchy" button within discipline concept form 252. An example of a hierarchy of instructional activities is shown in FIG. 8. By selecting a concept on the hierarchy diagram, the selected concept is interfaced to appear on discipline concept form 252, located in the space next to the label "Add." The user may also type in the concept/s. When the "Add" button is selected, the concept appears as a discipline concept on curriculum mapping screen 250. Discipline concept form 252 also displays a "Concept Diagrams" button that provides sample diagrams the user can use to build their own concept maps. An example of a concept mapping diagram is illustrated in FIG. 9. Concept maps serve as an organizational tool for mental images of discipline concepts and information.

A discipline processes form is accessed by selecting a process skill(s) edit button from curriculum mapping screen 250. Discipline process skills are accessed and interfaced in the same format as discipline concept form 252 described above. The diagram displayed in discipline process form is the complexity of the learning process levels diagram previously discussed. The above described curriculum mapping illustrates that in planning for instructional activities, the first step is to focus on a topic/theme that can be viewed through a common discipline sharing a conceptual lens. This common conceptual lens elicits thinking to the integration level. Discipline specific processes and concepts are addressed separately in the planning of the instructional activity because they are nurtured and assessed quite differently than content. These discipline specific concepts and processes support and align with the discipline content that becomes integrated in the identified instructional activities 364. It is these discipline specific concepts, processes, and content that provides the knowledge needed, and it is the common discipline sharing conceptual lens that allows the student to see patterns and connections between discipline concepts that transfers across the curriculum and integrates thinking for higher conceptual understanding. From this curriculum mapping information, both reports and searches by topic/theme, grade level, time line, discipline and conceptual lens are available for quick access and organization of materials.

FIG. 10 is one embodiment of a national standards reference floating pop-up alignment tool illustrating "Level of Mastery" and "Scope and Sequence" as resources. These resources are aligned to national standards descriptors by content area and grade level. In the embodiment illustrated, a "Level of Mastery" (i.e., Introduced, Mastered, or Extended) can be selected by a user. The alignment to national standards descriptors continues to the "Scope and Sequence," which is a chart that illustrates grade-level articulation of the critical content (factual knowledge) and skills that are aligned to the national standards by level of proficiency. For example, for a fifth grade musician, a "mastered" level of mastery might include playing the F and Bb scales one octave, where an "introduced" level of mastery might include reading and performing on a musical instrument, a dotted eighth note followed by a sixteenth note. Such features help teachers identify essential skills and critical content that has been aligned to the standards, or identify gaps in the content and skills taught in the curriculum.

Appendix A illustrates a number of reports that can be generated from home screen 100. Specifically, a content standard report, a process standard report, a career path report, a technology report, a research report, an ethnic equity awareness report, a racial equity awareness report, and a gender equity awareness report are illustrated.

The reports are utilized to illustrate which course activities (e.g., activity sheet numbers) are aligned with a particular standard. In the example content standard report for fine arts 1, specifically for first grade music, a number of instructional strategies corresponding to respective course activity sheets are shown, including whole group, cooperative learning, and experiments. While a lesson plan including such strategies may be acceptable for first grade music, other strategies may be more appropriate for high school music. Similarly, the assessment types of performance events and observation may be sufficient for assessing first grade music students. However, for the high school student, multiple choice and constructed responses may be more applicable. By aligning the activity sheets with content standards, a teacher can determine if the activities are sufficiently presented to a student group, and if the assessments utilized by a state are properly supported in the lesson plan for the student group and reasonably related to the particular content standard.

The process standard report utilizes the same philosophy as the content standard report for determining if the course activities, instructional strategies and assessments are correct for the student group attempting to satisfy the state's process standard A career path report is used to identify courses and corresponding activity sheets that are applicable to a career path. In the example career path report, the music classes and activity sheets listed are geared towards an arts and communications career path as opposed to, for example, an engineering technology. A listing of nationally defined career paths are also shown.

A technology report indicates which course activity sheets, and therefore lesson plans, are aligned with utilization of a particular technology, for example, keyboarding, computer/internet, audio visual/graphic calculator, and publishing. A research report indicates which course activity sheets, and therefore lesson plans, are aligned with utilization of a particular research methodology, for example, experimental research and literary research. Similar reports are generated to ensure that course activities are equitably balanced along ethnic, racial and gender awareness lines by indicating which activity sheets in a lesson plan support or are focused on such awareness.

The above described tools, user interfaces, and methods provide an entity with an ability to effectively develop and assess a curriculum. The curriculum is aligned to national, state, and local standards through the development of instructional activities. In one embodiment, the instructional activities are concept based, and an educator is easily able to generate reports which indicate the disciplines, courses, and instructional activities within the concepts that are aligned with a particular standard. In this way, curriculum adjustments that are needed can be easily identified, for example, when a standard is not adequately supported by instructional activities. In addition, reports can be generated as to career paths, technology, and equity awareness to provide further feedback as to the completeness of a curriculum.

The above described methods and tools assist teachers and the like in building curriculums, assessments, and teaching strategies that support a conceptual framework that spirals through the steps (complexity levels) of the conceptual process, rather than a memorization of facts. The methods and apparatus described identifies, builds, and strengthens connections, relationships, and patterns between the transferable concepts in each content area. In addition, the methods and apparatus allow for the deeper factual knowledge, conceptual understanding, and integration across content areas that are required by educational standards.

Further, a curriculum can be planned which focuses on an instructional curriculum format that supports a hierarchy of conceptual development, for example, knowledge, comprehension, application, analysis, synthesis, and evaluation, and a complexity of the learning process levels, for example, capturing, connecting, performing, responding, creating, valuing, and characterizing. This method of instructional curriculum planned also provides for the mapping of concepts and processes with the scope and sequence of each discipline's critical content (i.e., factual knowledge and skill based objectives) and provides the format for instructional strategies, interdisciplinary connects, and assessment for the in-depth knowledge, skills and processes required by educational standards.

While the invention has been described in terms of various specific embodiments, those skilled in the art will recognize that the invention can be practiced with modification within the spirit and scope of the claims.

What is claimed is:

1. A method for curriculum planning using a curriculum planning tool, said method comprising:
   selecting a grade level, an academic discipline, and a course within the academic discipline;
   entering local objectives to be met by the selected course;
   aligning the local objectives with one or more standards;
   mapping the selections, local objectives, and standards into one or more key concepts that support interdisciplinary connections and promote conceptual development through integration of shared discipline concepts;
   developing instructional activities for the selected course that teach key concepts, processes, and critical content through a guided format that includes prior knowledge, preparation, presentation, and practice/process and supports different ability levels; and
   assessing the curriculum against the standards using criterion-reference assessments that are aligned with a learning process complexity and based on instructional activities.

2. A method according to claim 1 further comprising:
   selecting discipline specific processes that are organized by learning process complexity; and
   selecting a critical content and vocabulary for the discipline specific processes as identified in a scope and sequence for the discipline aligned with the national standards.

3. A method according to claim 1 wherein mapping the selections, local objectives, and standards into one or more key concepts comprises supporting a conceptual framework that incorporates a hierarchy of conceptual development for the conceptual process.

4. A method according to claim 1 further comprising developing a framework for sequential strategies based on learning process complexity.

5. A method according to claim 1 wherein developing instructional activities for the curriculum comprises developing and aligning instructional activities for the curriculum that teach a structural process of conceptual development and the relationships between concepts and factual knowledge, a sequential complexity of the learning process and its relationship to skill-based objectives, and the development of both discipline specific concepts and common discipline-shared concepts for interdisciplinary connections and integration of knowledge.

6. A method according to claim 1 wherein the standards include one or more of national standards, state standards, local standards, district standards, and school standards.

7. A method according to claim 1 further comprising providing an assessment for a student based on a result of the instructional activity.

8. A method according to claim 1 further comprising aligning the assessment with the key concepts and state discipline-specific grade-level expectations.

9. A method according to claim 1 wherein assessing the curriculum against the standards comprises:
   selecting a standard; and
   preparing a report illustrating which of the instructional activities apply to the selected standard.

10. A method according to claim 9 wherein the selected standard comprises one or more of a content standard and a process standard.

11. A method according to claim 9 further comprising including an instructional strategy and assessment type in the report for each instructional activity.

12. A method according to claim 1 further comprising preparing at least one of a career path report, a technology report, a research report, an ethnic equity awareness report, a racial equity awareness report, and a gender equity awareness report illustrating which of the instructional activities apply to the prepared reports.

13. A method according to claim 1 wherein selecting a course further comprises selecting a subtopic within the course.

14. A method according to claim 1 wherein mapping the selections, local objectives, and standards into one or more concepts comprises:
   identifying a topic; and
   viewing the topic through a conceptual lens connecting components in one or more disciplines.

15. A computer for curriculum assessment, said computer programmed to:
   accept input data relating to grade level selection, academic discipline selection, course selection within the academic discipline, and local objectives to be met by the selected course;
   align the local objectives with discipline specific grade level objectives and one or more standards;
   map critical content and process level input data with one or more integrated, shared discipline concepts to be taught and the standards;
   accept input data relating to instructional activities that are developed by using a guided format outlining prior knowledge, preparation, presentation, and practice/process and supporting different ability levels, developed by the user, for teaching the concepts; and
   assess the curriculum against the standards based on the instructional activities.

16. A computer according to claim 15 wherein to assess the curriculum said computer is programmed to accept input data relating to selection of a standard and generate a report illustrating which of the instructional activities apply to the selected standard.

17. A computer according to claim 16 wherein the selected standard comprises one or more of a content standard and a process standard.

18. A computer according to claim 15 wherein the report includes an instructional strategy and assessment type for each instructional activity.

19. A computer according to claim 15 wherein the report includes the academic discipline, grade level, and course for each instructional activity.

20. A computer according to claim 15 wherein to assess the curriculum said computer is programmed to generate at least one of a career path report, a technology report, a research report, an ethnic equity awareness report, a racial equity awareness report, and a gender equity awareness report illustrating which of the instructional activities apply to the prepared reports.

21. A method for mapping a curriculum according to concepts utilizing a curriculum mapping tool, said method comprising:

choosing a grade level, a topic, and a concept;

selecting an academic discipline and a course within the discipline to be used for teaching the concept;

selecting a discipline-specific subtopic;

choosing at least one of a discipline concept and a discipline process;

generating at least one of a concept map of information and a process map action, based upon said choice of discipline process and discipline concept; and developing instructional activities through a guided format that includes prior knowledge, preparation, presentation, and practice/process and supports different ability levels for the course which align with the concept.

22. A method according to claim 21 further comprising reporting which instructional activities are applicable to a selected standard.

23. A method according to claim 22 further comprising making changes to the curriculum based on the instructional activities which align with a selected concept.

24. A method according to claim 21 further comprising reporting which instructional activities are applicable to one or more of a career path, a technology, research, ethnic equity awareness, racial equity awareness, and gender equity awareness.

* * * * *